United States Patent
Follingstad et al.

(12) 
(10) Patent No.: US 6,468,112 B1
(45) Date of Patent: Oct. 22, 2002

(54) VERTICAL CABLE MANAGEMENT SYSTEM WITH RIBCAGE STRUCTURE

(75) Inventors: Michael Jay Follingstad, Edina, MN (US); Eric Lovaasen, Chaska, MN (US); Jane Livingston, Tonka Bay, MN (US); Al Feaster, Eden Prairie, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 09/228,343

(22) Filed: Jan. 11, 1999

(51) Int. Cl.⁷ .................................................. G02B 6/00

(52) U.S. Cl. ....................................... 439/719; 385/135

(58) Field of Search ......................... 439/719; 385/135; 361/825, 826, 827, 829; 379/327

(56) References Cited

U.S. PATENT DOCUMENTS

| | | | | |
|---|---|---|---|---|
| 1,862,571 A | * | 6/1932 | Goff ............................ | 439/719 |
| 2,896,009 A | * | 7/1959 | Caveny ..................... | 174/72 A |
| 3,024,301 A | * | 3/1962 | Walch | |
| 3,321,571 A | * | 5/1967 | Lynch | |
| 5,402,515 A | * | 3/1995 | Vidacovich et al. ......... | 385/135 |
| 5,640,482 A | * | 6/1997 | Barry et al. ................ | 385/135 |
| 5,715,348 A | * | 2/1998 | Falkenberg et al. ......... | 385/135 |
| 5,758,002 A | * | 5/1998 | Walters ...................... | 385/135 |

FOREIGN PATENT DOCUMENTS

| | | |
|---|---|---|
| DE | 27 54 558 | 11/1978 |
| EP | 0 491 245 A1 | 6/1992 |
| EP | 0 493 740 A1 | 7/1992 |
| WO | WO 91/15086 | 10/1991 |

OTHER PUBLICATIONS

ADC Telecommunications catalog entitled "Fiber Cable Management Products, Second Edition," front cover, back cover, and pp. 2–21 91, 104, and 105, dated Oct. 1995.

ADC Telecommunications catalog entitled "Digital Signal–Connect (DSX–3) Front and Rear Cross–Connect Products," front cover, back cover, and pp. 26, 27, 42, and 44, dated Jul. 1996.

Panduit Corp. catalog entitled "Communication Products," front cover, back cover, and pp. 59, 60, 61, 71, and 72, dated 1996.

Middle Atlantic Products, Inc. catalog entitled "Rackmount Solutions," front cover, back cover, and p. 26, dated Apr. 1998.

Photographs of a cabel management product by Panduit Corp.

Drawing of an ADC Telecommunications, Inc. commericial product, one page.

ADC Telecommunications, Inc. catalog entitled "FL2000 Products," dated 11/96, 51 pages.

(List continued on next page.)

*Primary Examiner*—Neil Abrams
(74) *Attorney, Agent, or Firm*—Merchant & Gould P.C.

(57) ABSTRACT

A cable management system (20) is provided including a rack (22) for holding telecommunications equipment (24), and a ribcage cable support member (60) along a vertical side of the rack. The ribcage cable support member includes a plurality of forwardly and rearwardly extending ribs (116, 118). The ribs each include cable retention tabs (124). A plurality of spools (70) are provided for cable storage on the ribcage cable support member. Holes (82) through the ribcage cable support member allow access between the front and rear portions. An additional rack may be positioned on an opposite side of the ribcage cable support member to the first rack, and two columns of ribs are provided. Resilient plastic edge protectors (150) may be fitted onto the ribs (119).

23 Claims, 13 Drawing Sheets

OTHER PUBLICATIONS

ADC Telecommunications, Inc. catalog entitled "Fiber Panel Products, Second Edition," dated 7/96, 117 pages.

ADC Telecommunications, Inc. catalog entitled "Next Generation Frame (NGF) Product Family Ordering Guide," dated 10/98, 24 pages.

ADC Telecommunications, Inc. catalog entitled "Fiber Cable Management Products, Third Edition," dated 6/98, 142 pages.

ADC Telecommmunications, Inc. catalog entitled "Value–Added Module System," dated 6/98, 37 pages.

* cited by examiner

FIG. 3

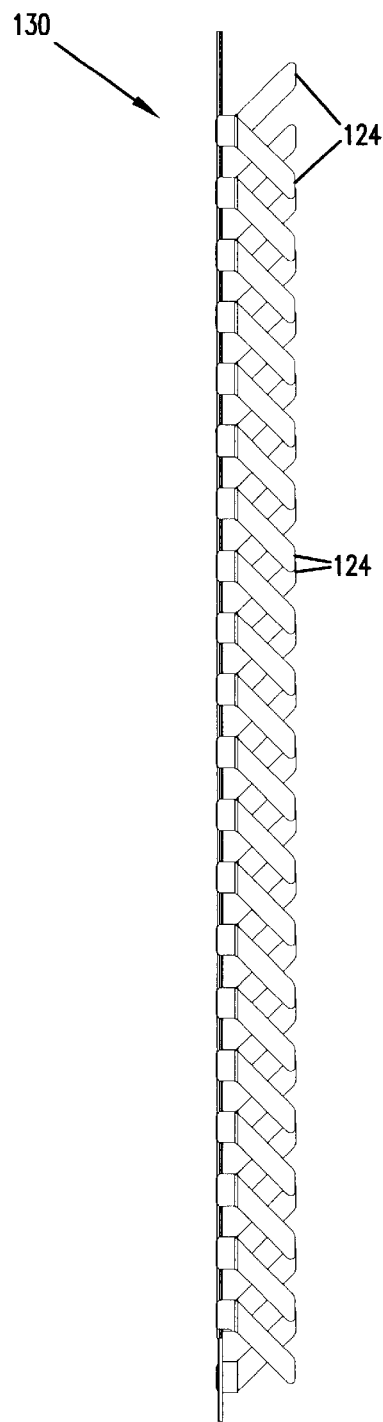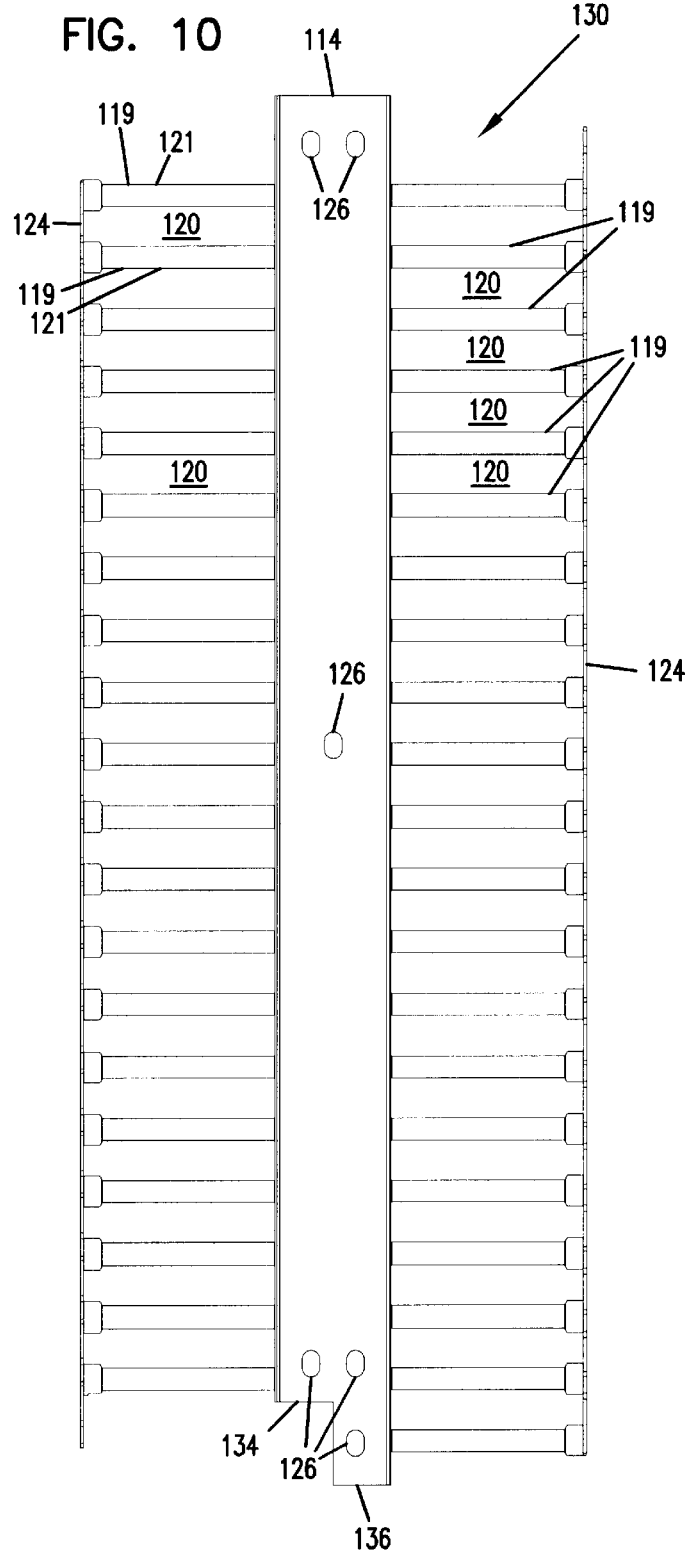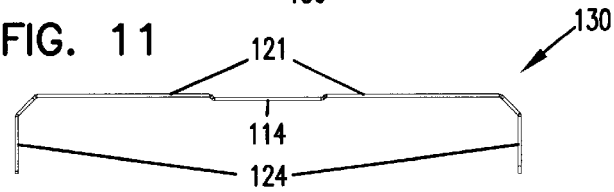

VERTICAL CABLE MANAGEMENT SYSTEM WITH RIBCAGE STRUCTURE

FIELD OF THE INVENTION

The present invention relates to cable management systems for telecommunications cables.

BACKGROUND OF THE INVENTION

Suppliers and users of structured connectivity communications systems in local area networks often have difficulty managing the cabling and demarcation and patching points such as in communications closets and computer rooms. Here, large numbers of data, voice, and video communications circuits, cables and connectors may be concentrated into small areas on relay racks and in communications cabinets resulting in congestion of cabling and connectors. In the past, connectivity systems attempted to ease the congestion of cabling and connectors by integrating cable management devices within and around the racks and cabinets. In the connectivity industry, horizontal cable management devices may be provided between each row of patch panels. As a result, applications with a high number of network connections or circuits must generally double the amount of racks and floor space needed in order to accommodate the horizontal management devices for cable management. Minimizing the space consumed by the cable management systems, and managing the cable in an efficient manner are desired.

SUMMARY OF THE INVENTION

One aspect of the present invention relates to a cable management system including a rack and a ribcage cable support member. The rack includes a base, and two upwardly extending side supports configured and arranged for holding telecommunications equipment having cable connection locations. The rack further has a front, a rear, and a vertical side. The ribcage cable support member is mounted to the rack along the vertical side. The ribcage cable support member includes a middle support having a front, a rear, and two sides. The middle support includes a plurality of spools positioned on the front, and a plurality of holes between the front and the rear. Two columns of spaced-apart ribs are on each side of the middle support. Each column of ribs includes a first set of ribs extending transversely away from the middle support on the front, and a second set of ribs extending transversely away from the middle support on the rear. Each rib further includes a cable retention tab, where each cable retention tab extends generally toward the ribs of the corresponding set in the other column. First and second cable positioning chambers on opposite sides of the middle support are defined by the middle support and the two columns of spaced art ribs.

A further aspect of the present invention relates to a cable management device for use with a telecommunications equipment rack. The cable management device includes a generally planar spine section extending in a longitudinal direction, and mounting holes for receipt of fasteners to mount the planar spine section to the rack. First and second sets of ribs extend from the planar spine section in opposite directions, each opposite direction transverse to the longitudinal direction. Each rib has a main portion extending parallel to the planar spine section and transversely to the longitudinal direction. Each rib further has a tab on an end of the main portion extending transversely to the main portion. The tabs of each of the first and second sets of ribs extend in the same general direction so as to define a U-shaped device along the longitudinal direction.

BRIEF DESCRIPTION OF THE DRAWINGS

Figure 3:
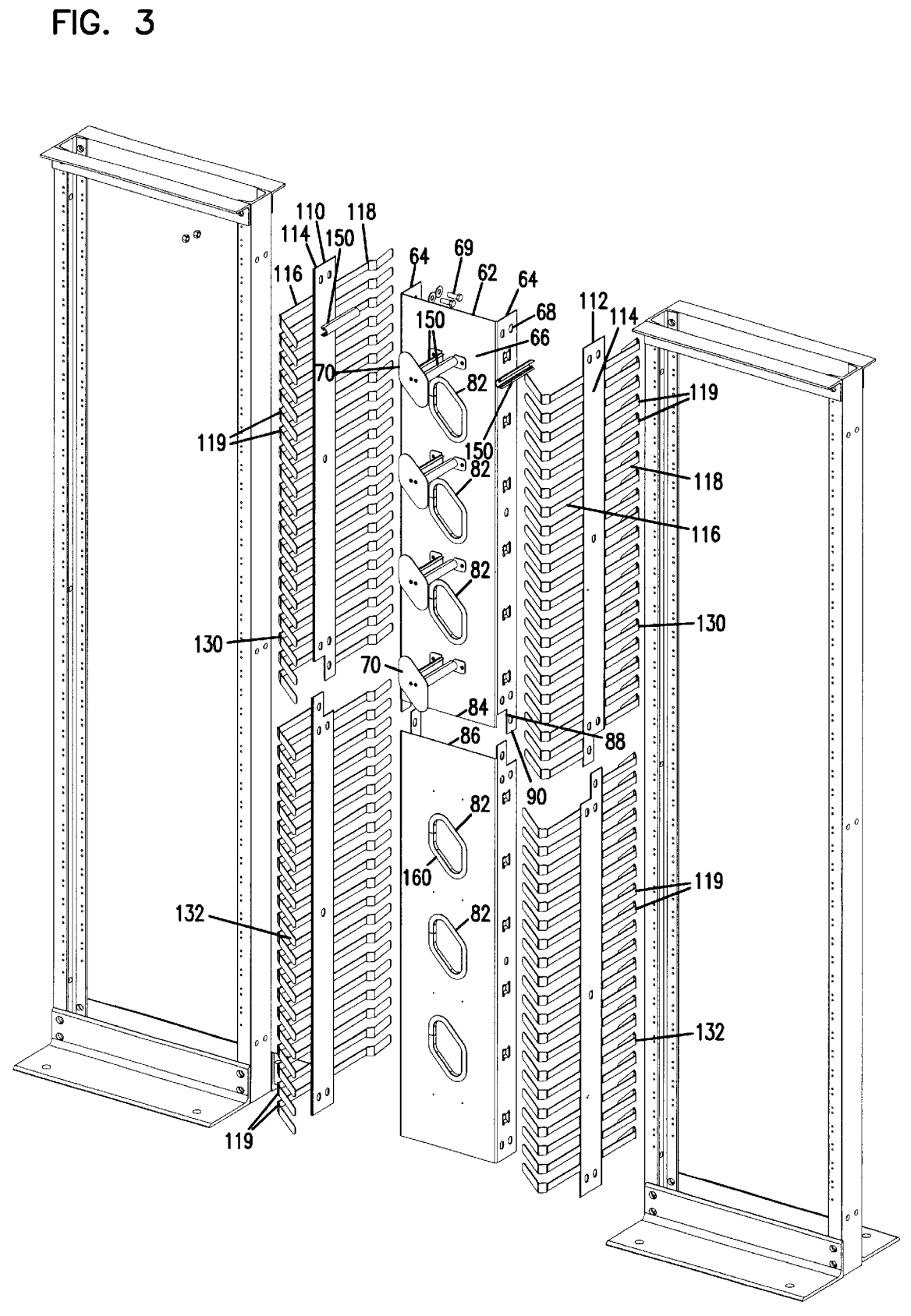

FIG. 3 is an exploded front perspective view of the cable management system of FIG. 1 without the patch panels;

FIG. 9 is a front view of one of the ribcage members used in the cable management system of FIG. 1;

FIG. 10 is a right side view of the ribcage member of FIG. 9;

FIG. 11 is a top view of the ribcage member of FIG. 9;

DETAILED DESCRIPTION OF THE PREFERRED EMBODIMENT

Figure 1:
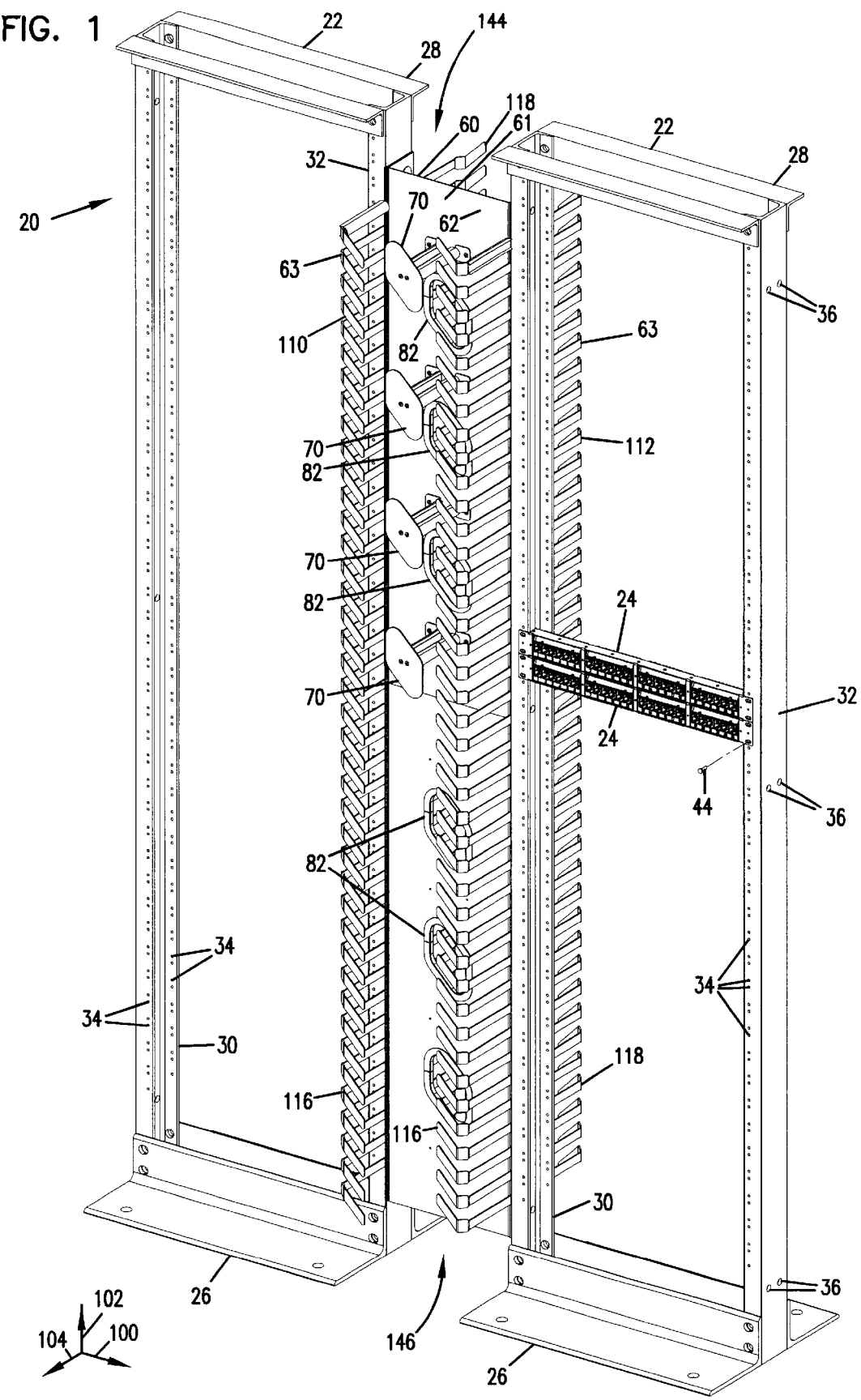
FIG. 1 is a front perspective view of one embodiment of a cable management system in accordance with the present invention, including two racks with two patch panels in one of the racks, and a vertical cable management assembly positioned between the two racks.
Figure 2:
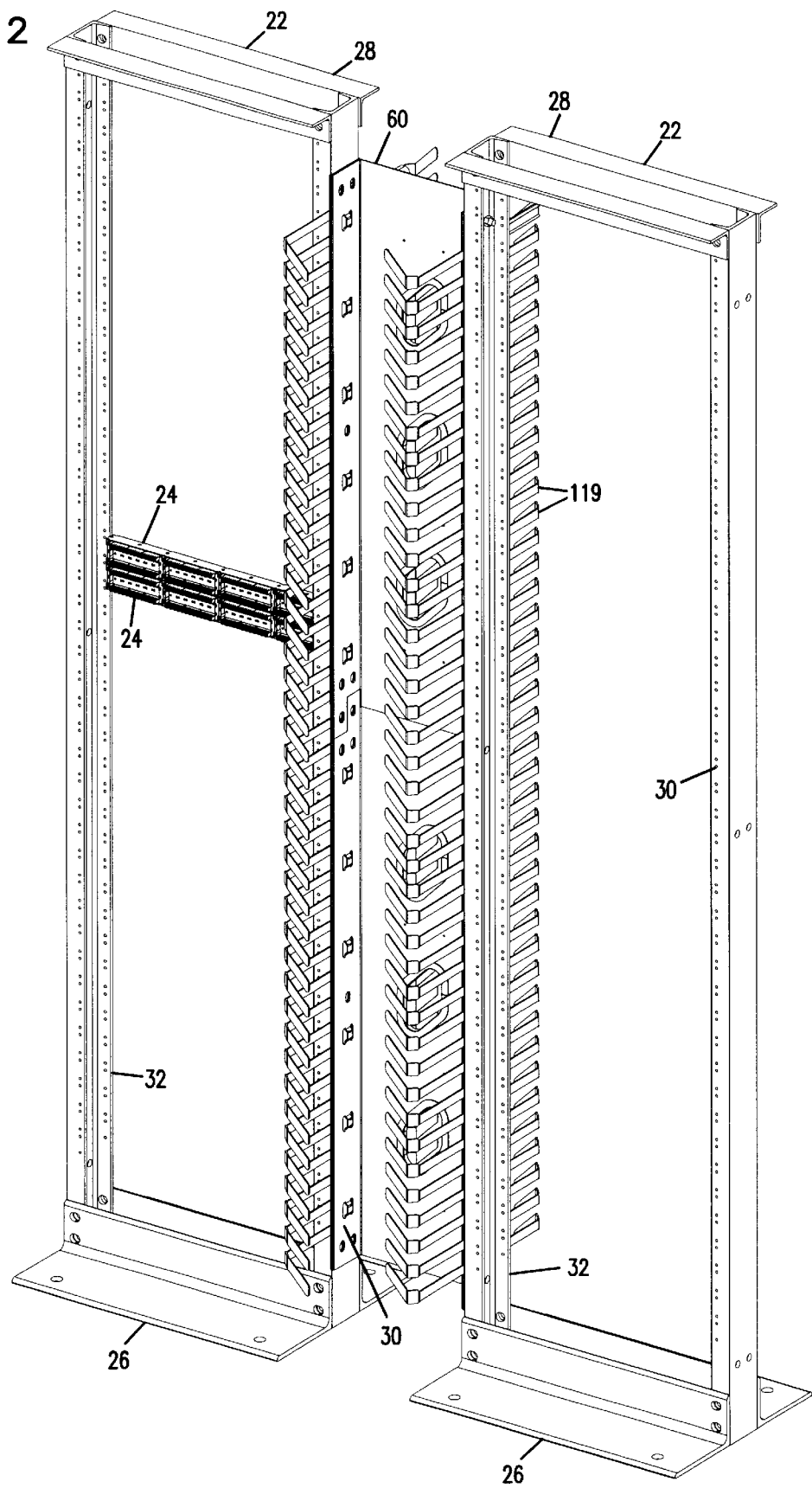
FIG. 2 is a rear perspective view of the cable management system of FIG. 1.
Figure 4:
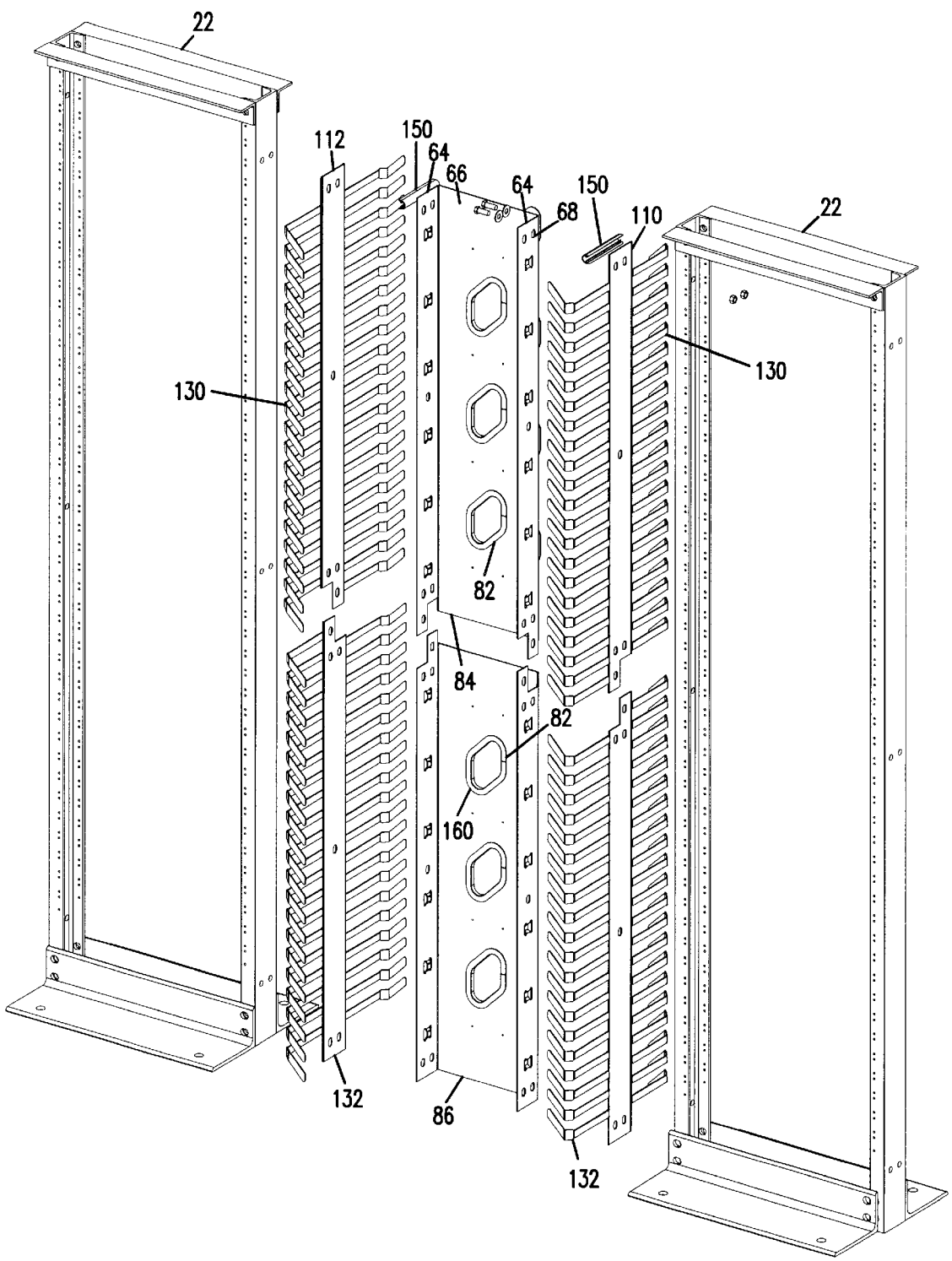
FIG. 4 is an exploded rear perspective view of the cable management system of FIG. 1.
Figure 5:
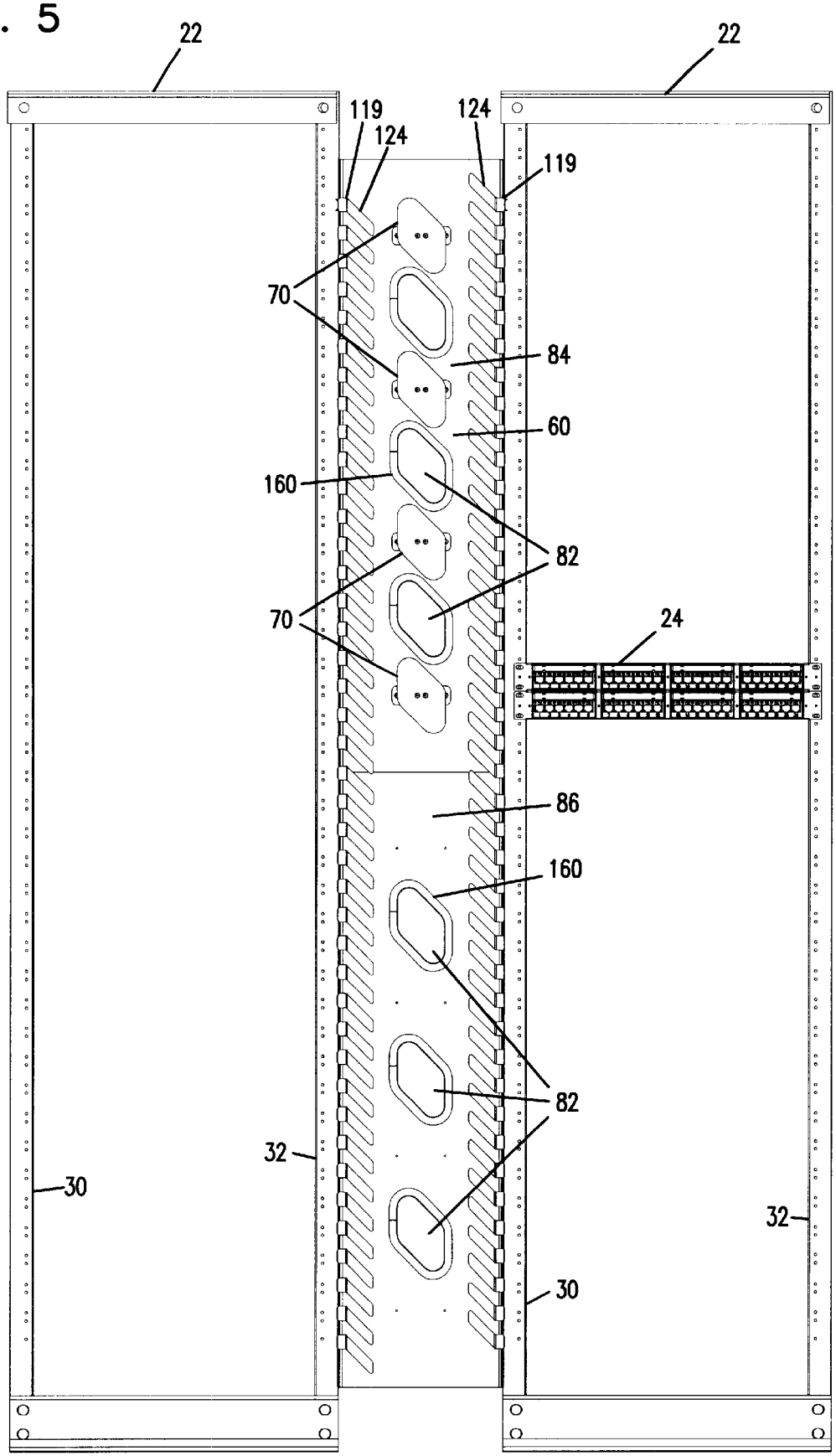
FIG. 5 is a front view of the cable management system of FIG. 1.

The cable management systems of the present invention allow for management of cable in and around telecommunications equipment racks and cabinets. The telecommunications cable may be fiber optic-based, copper-based, and combinations thereof. The cable management system maintains and directs cables connected to the telecommunications equipment.

Referring now to the figures, one preferred embodiment of a cable management system 20 is shown including two vertical racks 22 configured and arranged for holding telecommunications equipment, such as a patch panel 24. Two patch panels 24 are shown in one of the racks 22. However, it is to be appreciated that additional patch panels 24, and other telecommunications connectivity equipment or cable management devices may be mounted to each of racks 22.

Each rack 22 includes a base 26, a top 28, and two side supports 30, 32 extending therebetween. Each side support 30, 32 includes a plurality of front and rear holes 34 for receiving fasteners to mount the telecommunications equipment to each rack 22. Side supports 30, 32 each generally define a U-shape and include side holes 36 for mounting to other racks, or in the case of the present invention, for mounting to a ribcage cable support member 60. Cable management system 20 generally defines an X-axis 100, a Y-axis 102, and a Z-axis 104. The side supports 30, 32 extend vertically in the direction of the Y-axis 102. The front and rear of system 20 face in the direction of the Z-axis 104. Ribcage cable support member 60 cooperates with racks 22 to vertically manage cable running to and from the equipment held by each rack 22. Typically, each cable connects to the respective piece of equipment, and the cable length travels horizontally to the nearest ribcage cable support member 60 where the cable length is supported and/or held in the desired position and directed for the distal end to be connected at another connection site.

Referring now to FIGS. 1, 2, 5, 6, 8, 16 and 17, patch panel 24 is an example of one type of telecommunications equipment mountable to racks 22. Patch panel 24 includes opposed flanges 40 defining holes 42 for receipt of fasteners 44. A front 46 of patch panel 24 defines a plurality of front connection locations 48 including a plurality of sockets 49 for receiving a connector plug of a copper-based patch cord or other telecommunications cable. A rear 50 of patch panel 24 includes a plurality of rear connection locations 52, such as insulation displacement connectors 53 for connecting to copper-based telecommunications cable. The connection locations 48, 52 are arranged in rows in patch panels 24. Patch panel 24 is the subject of U.S. Ser. No. 09/092,545, filed Jun. 5, 1998, the disclosure of which is incorporated by reference.

Ribcage cable support member 60 is shown positioned between two racks 22. Additional ribcage cable support members 60 can be positioned on the other ends of racks 22 along the X-axis 100, and between additional racks 22, if provided. Ribcage cable support member 60 includes a middle support 61 and two opposed columns of ribs 63 extending forwardly and rearwardly. Ribcage cable support member 60 of the illustrated preferred embodiment includes a central U-channel 62 including two side sections 64, and a middle section 66. Each side section 64 includes a plurality of holes 68 for receipt of a fastener 69.

Referring now to FIGS. 1, 3, 5, 6, 12 and 13, U-channel 62 includes a plurality of spools 70 for use in cable management, such as for storing excess lengths of cable. Each spool 70 in the illustrated preferred embodiment includes two supports, having legs 74 which are held by fasteners 76 to middle section 66 of U-channel 62. Each spool 70 further includes a cable retention flange 78 spaced from main middle section 66. Other spools are possible for cable storage.

Middle section 66 of U-channel 62 further preferably includes a plurality of openings 82 to allow for cable to pass between a front to a rear of ribcage cable support member 60. It is to be appreciated that any number of spools 70 can be provided, as well as any number of openings 82, as desired. In addition, the positioning of spools 70 and openings 82 can be varied as desired for particular cable management situations. For example, no spools 70 are provided in a lower portion of middle section 66. In the illustrated embodiment, spools 70 can be provided on the back of middle section 66 if desired.

To facilitate ease of manufacture, U-channel 62 can be made from identical upper and lower portions 84, 86. See FIGS. 3, 4, 5 and 8. Notches 88 are provided on mating ends 90 of upper and lower portions 84, 86. U-channel 62 may be made from various materials, including sheet metal or molded materials.

Ribcage cable support member 60 further includes two ribcage members 110, 112 positioned on opposite sides of middle section 66. Each ribcage member 110, 112 includes a central spine 114, and first and second sets 116, 118 of ribs 119 extending in opposite directions. First set 116 of ribs extends outwardly from spine 114 in the front. Second set 118 extends rearwardly from spine 114 in the opposite direction. Between each of the individual ribs 119 are spaces 120 for receipt of one or more cables. Distal ends 122 of each rib 119 include a tab 124 extending at an angle to both the rest of the rib, and to direction of extension of the columns of ribs. Main portion 121 of each rib extends in the direction of the Z-axis 104, and tabs 124 extend at an angle toward the other set of ribs in a plane defined by the X-axis 100 and the Y-axis 102. As shown in the example embodiment, tabs 124 can extend at an angle upwardly or downwardly. While main portion 121 of each rib 119 extends horizontally in the preferred embodiment, cable positioned in space 120 tends not to fall out or slide out during handling of other cables due to the angled extension of tabs 124.

Each ribcage member 110, 112 includes openings 126 for receipt of fasteners 69 so as to facilitate assembly with U-channel 62 and racks 22. To facilitate manufacture, it is preferred that ribcage members 110, 112 are identical and that each be made from identical upper and lower portions 130, 132. See FIGS. 3, 4 and 9–11. Notches 134 are provided at mating ends 136.

Figure 6:
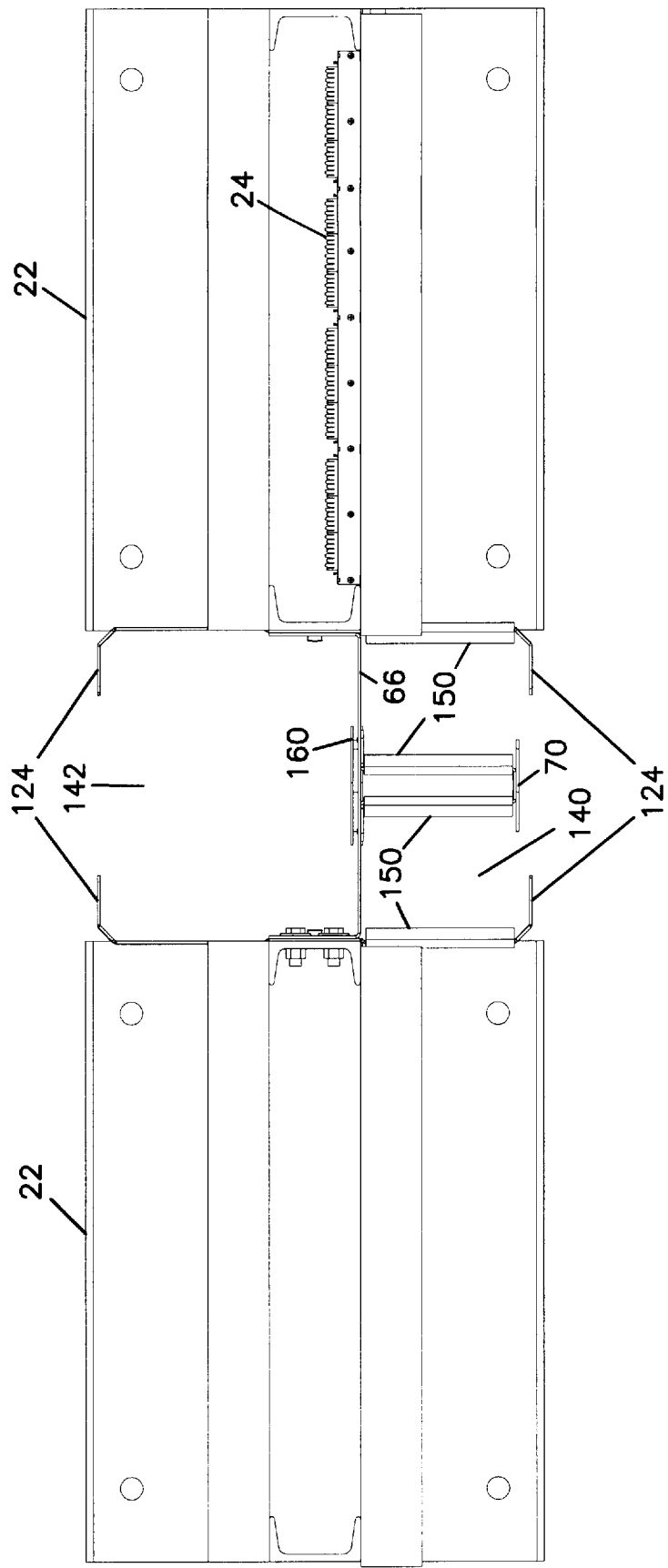
FIG. 6 is a top view of the cable management system of FIG. 1.
Figure 7:
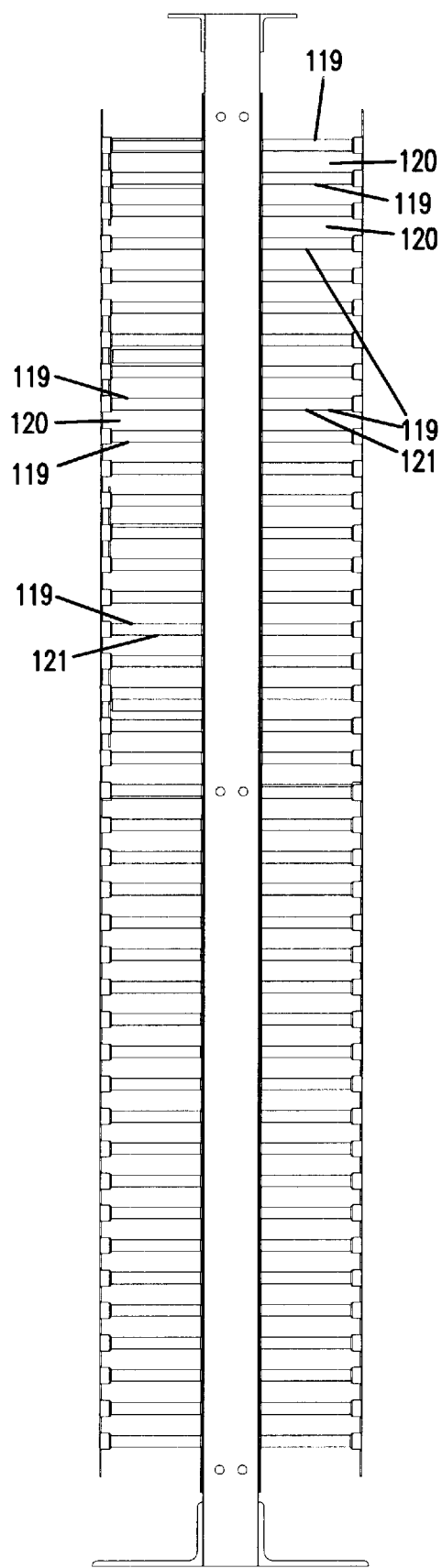
FIG. 7 is a right side view of the cable management system of FIG. 1.
Figure 8:
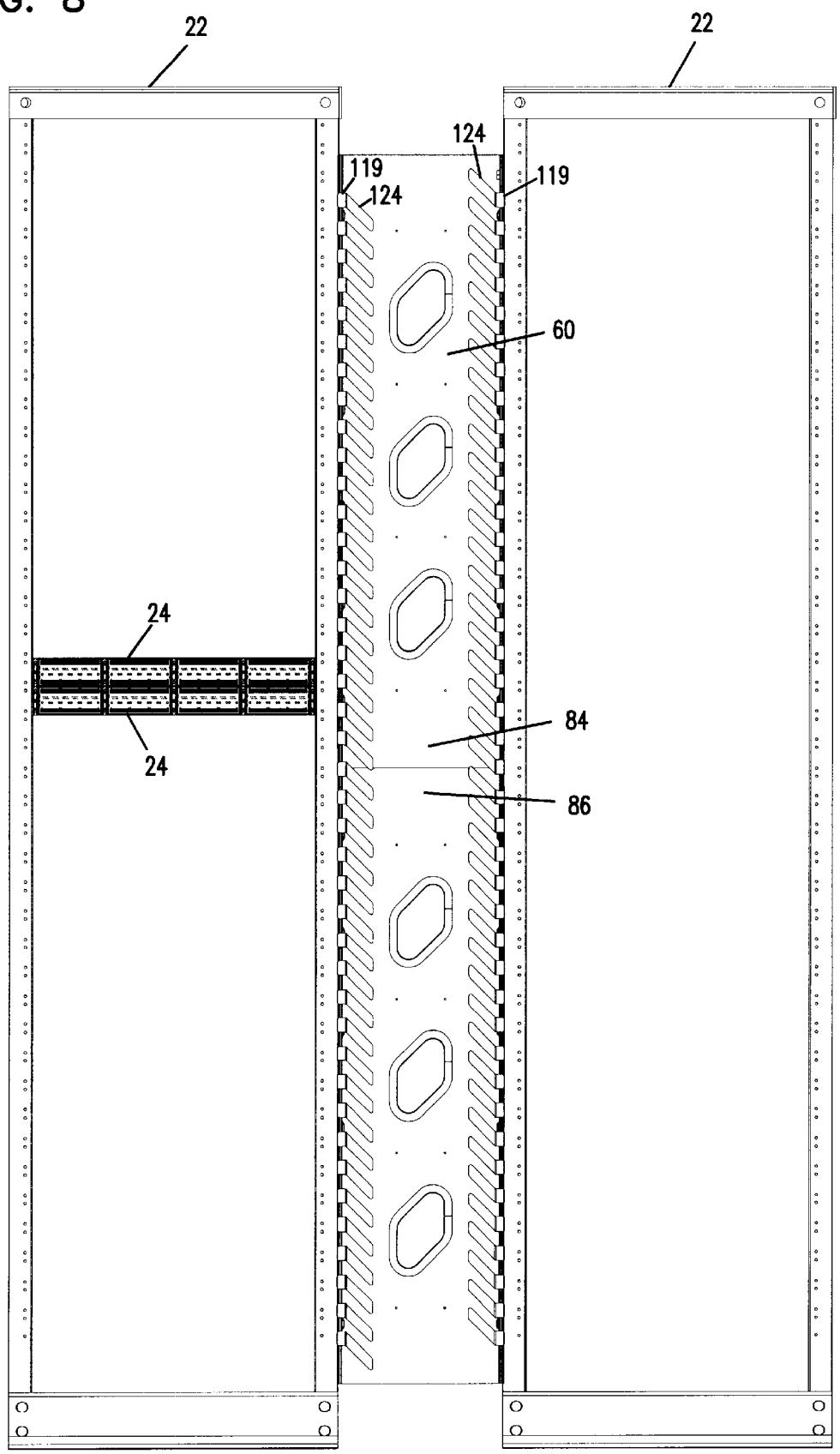
FIG. 8 is a rear view of the cable management system of FIG. 1.
Figure 13:
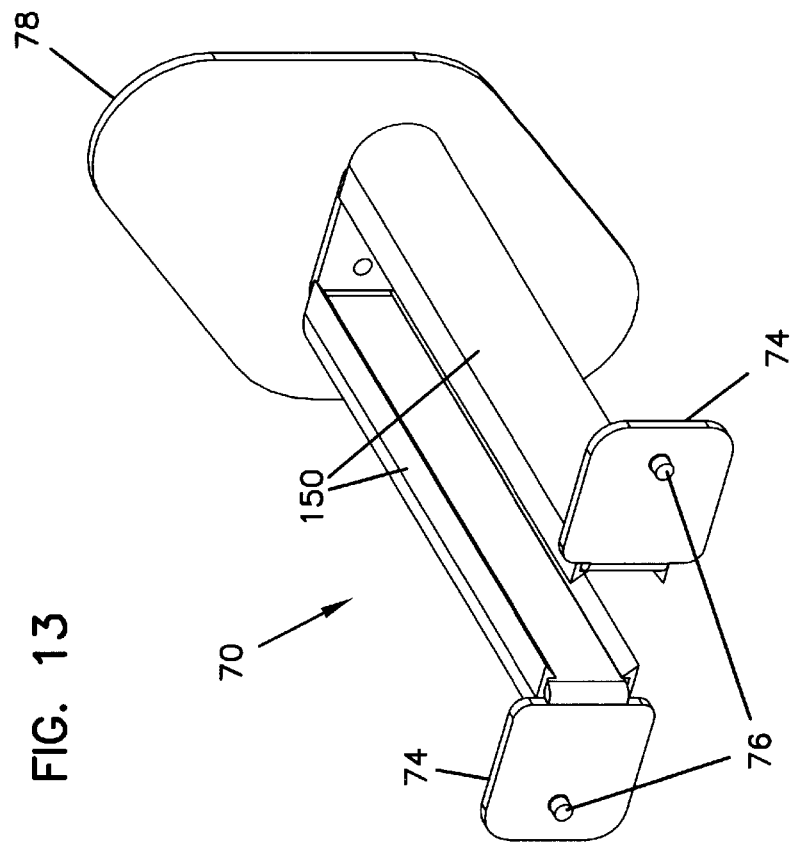
FIG. 13 is a rear perspective view of the cable spool shown in FIG. 12.
Figure 12:
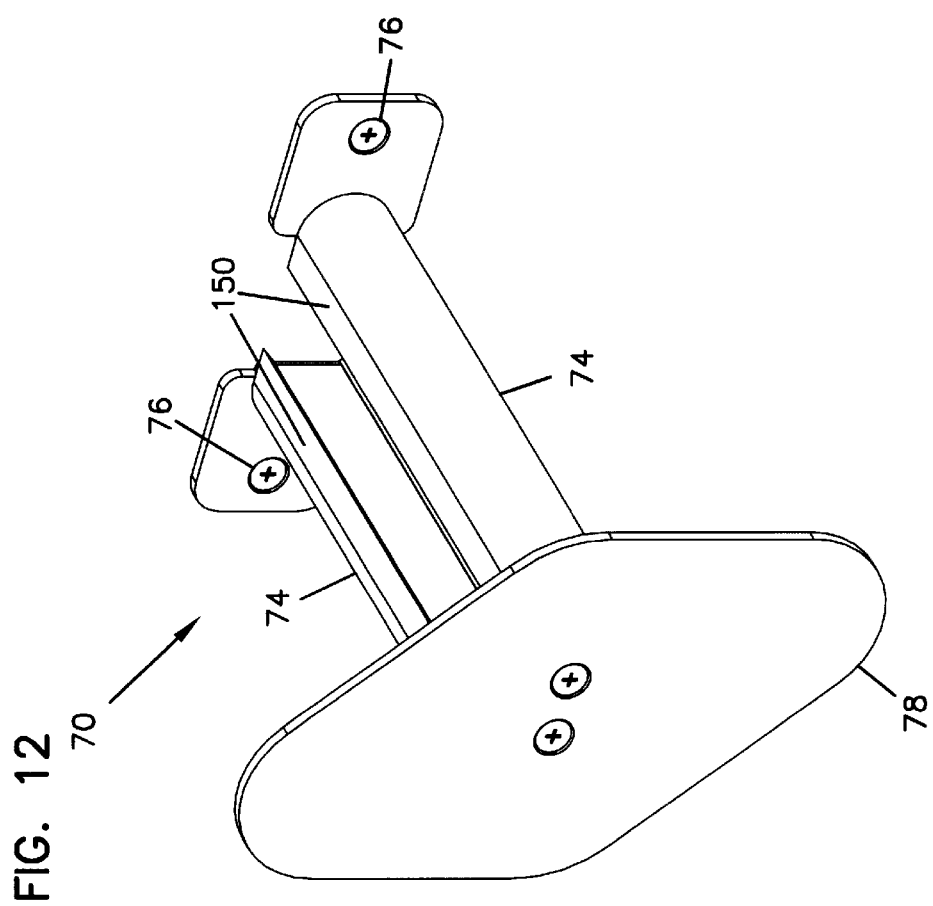
FIG. 12 is a front perspective view of one of the cable spools used in the cable management system of FIG. 1.
Figure 14:
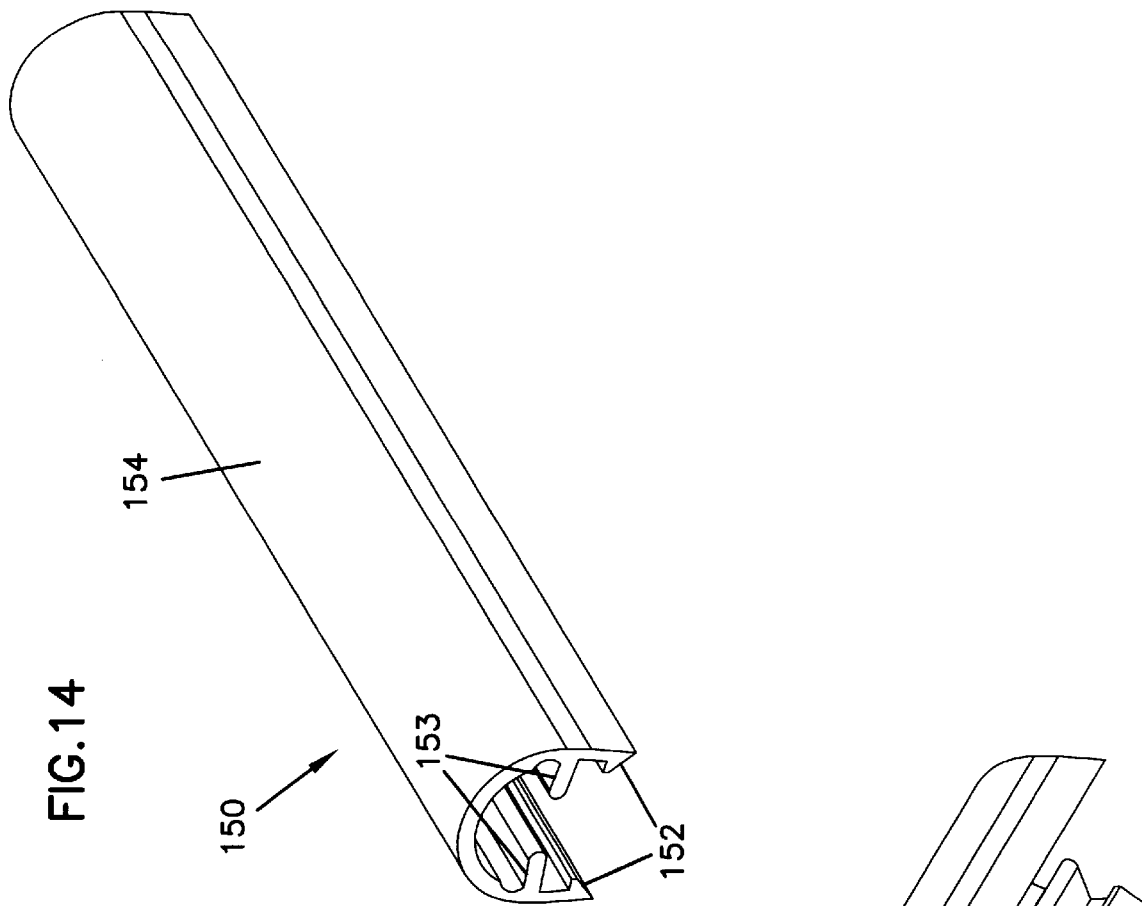
FIG. 14 is a first perspective view of one of the edge protectors used in the cable management system of FIG. 1.
Figure 15:
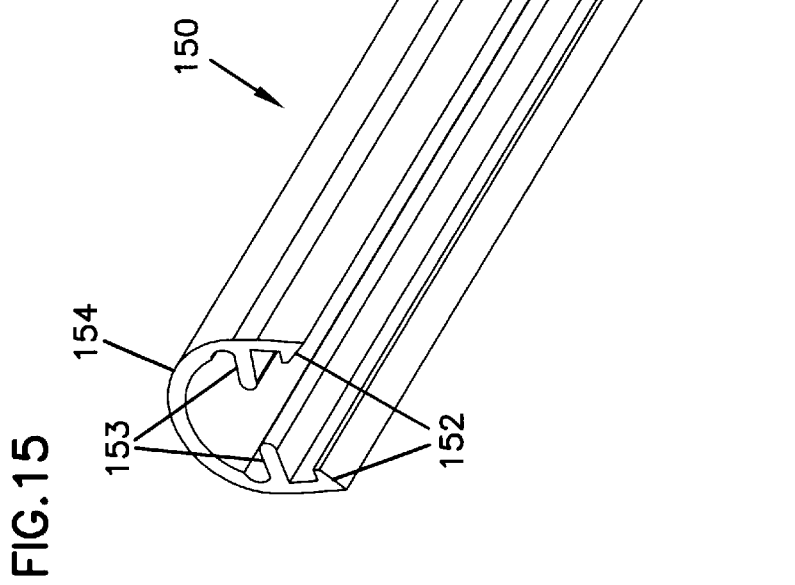
FIG. 15 is a further perspective view of the edge protector of FIG. 14.
Figure 16:
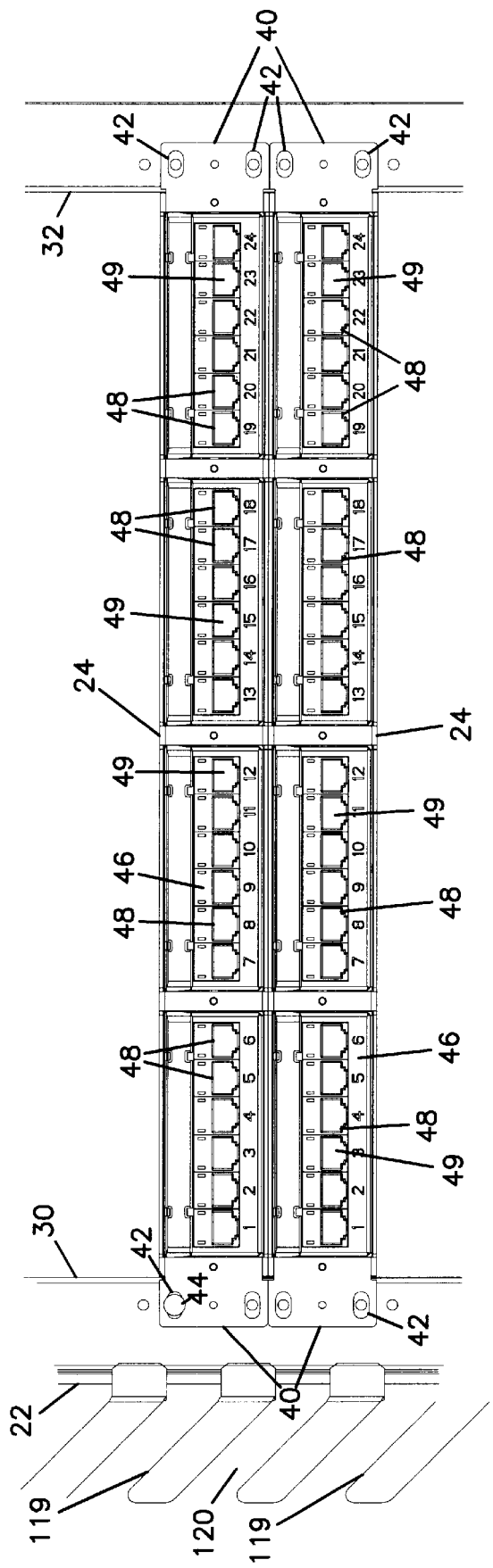
FIG. 16 is an enlarged view of the patch panels and a portion of one of the racks of FIG. 1.
Figure 17:
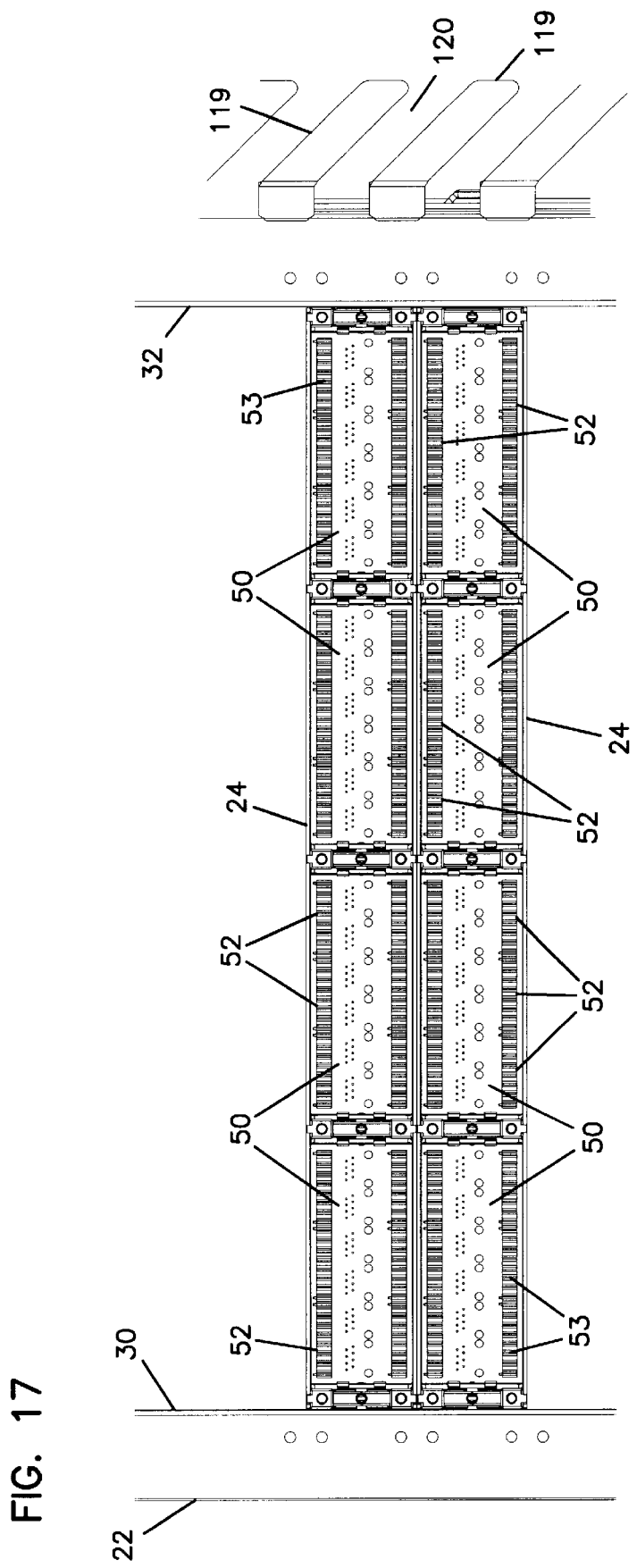
FIG. 17 is a rear view of the patch panels and the portion of the rack shown in FIG. 16.

As shown in FIG. 6, ribcage cable support member 60 defines a front cable chamber 140, and a rear cable chamber 142. Cable enters and exits each of chambers 140, 142 in spaces 120 between ribs 119, or at upper or lower ends 144, 146 of ribcage cable support member 60. Also, cable can pass between chambers 140, 142 through openings 82.

Ribcage members 110, 112 can be stamped from metal, and bent to the configuration shown. Alternatively, ribcage members 110, 112 can be made from molded materials. To assist with protection of the cables, especially fiber optic cables, and copper cables susceptible to damage from being cut and/or being bent beyond a minimum bend radius, resilient plastic edge protectors 150 are provided on ribs 119, and also supports 72 of spools 70. Each edge protector 150 includes opposed snaps 152, opposed stops 153 and a radius cable protection portion 154. Each edge protector 150 can be conveniently snapped on to rib 19 or support 72. A further edge protector 160 is positioned around the edge of openings 82 of U-channel 62. If ribcage members 110, 112 are made from molded materials, the edge protectors 150 can be molded integrally with them, if desired.

In use, cable extends from a front of patch panel 24 generally horizontally to a space 120 between ribs 119 and into front chamber 140. The cable is supported and managed by ribcage cable support member 60 where the cable may be: (1) wrapped around one or more spools 72, (2) passed through opening 82, (3) passed through upper or lower ends 144, 146, or (4) positioned back in a space 120 between ribs 119 to a desired patch panel 24, or other telecommunications equipment for connection to the equipment. Cable at the rear of patch panel 24 also extends generally horizontally to rear chamber 142 where ribcage cable support member 60 supports the cable at one of the ribs 119 at the rear where the cable is allowed to be directed toward the distal end connection site in a similar manner as the front cables.

In the preferred system, a rib 119 is advantageously positioned vertically adjacent to each row of connection locations on the front and/or the rear of the equipment in the racks 22. The ribs 119 offer support for each cable entering and exiting rack 22 at the particular height for connection to the connection locations of the telecommunications equipment. In that type of use, should it be desirable to later remove a cable from a space 120, access is convenient since only the cables from one row of connection locations are typically positioned in that space 120. The use of the individual ribs for each row of connection locations allows for the racks 22 to include a higher density of connection locations by avoiding or reducing the use of horizontal cable management devices between the equipment in each rack if desired.

Having described the present invention in a preferred embodiment, modifications and equivalents may occur to one skilled in the art. It is intended that such modifications and equivalents shall be included within the scope of the claims which are appended hereto.

What is claimed is:

1. A cable management system comprising:
   a) a mounting fixture including a base, and two upwardly extending side supports configured and arranged for holding telecommunications equipment having cable connection locations, the mounting fixture further having a front, a rear, and a side; and
   b) a ribcage cable support member mounted to the mounting fixture and positioned along the side, the ribcage cable support member including:
      1) a middle support having a front, a rear, and two sides, the middle support including:
         A) a plurality of spools positioned on the front, wherein each spool includes a cable support extending from the front and a cable retention member spaced from the front; and
         B) a plurality of holes between the front and the rear; and
      2) two columns of spaced-apart ribs on each side, each column of ribs including a first set of ribs extending transversely away from the middle support on the front, and a second set of ribs extending transversely away from the middle support on the rear, each rib including a cable retention tab, each cable retention tab extending generally toward the ribs of the corresponding set in the other column wherein first and second cable positioning chambers on opposite sides of the middle support are defined by the middle support and the two columns of spaced apart ribs, wherein the cable retention tabs of one of the first sets of ribs are spaced from the cable retention tabs of the other of the first sets of ribs to define a vertical spacing, the vertical spacing extending rearwardly toward the front of the middle support, wherein the cable support and the cable retention member of the spools are positioned only in the vertical spacing.

2. The system of claim 1, wherein the mounting fixture is a first mounting fixture and, further comprising a second mounting fixture, the ribcage cable support member positioned between the first and second mounting fixtures.

3. The system of claim 1, further comprising telecommunications equipment mounted to the mounting fixture, the equipment defining a plurality of rows of connection locations on a front of the equipment, the first set of ribs positioned so as to have a rib adjacent to each row of connection locations.

4. The system of claim 1, wherein the cable retention tabs extend at an angle toward the ribs of the corresponding set in the other column.

5. The system of claim 1, wherein each rib from the first set is aligned with one of the ribs from the second set.

6. A cable management device for use with a telecommunications equipment mounting fixture, the cable management device comprising:
   a generally planar spine section extending in a longitudinal direction and including a plurality of mounting holes each for receipt of a fastener to mount the planar spine section to the mounting fixture;
   first and second sets of ribs extending from the planar spine section in opposite directions, each opposite direction transverse to the longitudinal direction, each rib from the first set aligned with one of the ribs from the second set, each rib having a main portion extending parallel to the planar spine section and transversely to the longitudinal direction, each rib having a tab on an end of the main portion extending transversely to the main portion, the tabs of each of the first and second sets of ribs extending in the same general direction so as to define a U-shaped device along the longitudinal direction.

7. The device of claim 6, wherein the ribs include a first planar portion made of sheet metal, and a resilient plastic edge protector mounted to the first planar portion.

8. The device of claim 7, wherein the edge protector has a U-shape and two opposed inner snaps for snap mounting to the first planar portion of the rib.

9. The device of claim 6, wherein the device is made up of identical halves, inversely positioned relative to one another.

10. The device of claim 9 further comprising a middle support, and wherein the planar spine section and the first and second set of ribs form a first ribcage cable support mounted to the middle support, and further comprising a second ribcage cable support mounted to the middle support, the second ribcage support spaced from the first ribcage support and including a planar spine section, and first and second sets of ribs including tabs, the tabs of each of the first and second sets of ribs of each of the first and second ribcage supports extending toward one another.

11. The device of claim 10 wherein the tabs are non-perpendicularly angled relative to the longitudinal direction.

12. The device of claim 11, wherein the device is made up of identical halves, inversely positioned relative to one another.

13. The device of claim 10, further comprising a cable spool mounted to the middle support.

14. The device of claim 6, wherein the tabs are non-perpendicularly angled relative to the longitudinal direction.

15. A cable management device for use with a telecommunications equipment mounting fixture, the cable management device comprising:
   a) a middle support having a front, a rear, and two sides, the middle support including:
      1) a plurality of spools positioned on the front, wherein each spool includes a cable support extending from the front and a cable retention member spaced from the front; and
      2) a hole between the front and the rear; and
   b) two columns of spaced-apart ribs on each side, each column of ribs including a first set of ribs extending transversely away from the middle support on the front, and a second set of ribs extending transversely away from the middle support on the rear, each rib including a cable retention tab, each cable retention tab extending generally toward the ribs of the corresponding set in the other column wherein first and second cable positioning chambers on opposite sides of the middle support are defined by the middle support and the two columns of spaced apart ribs, the tabs extending at an angle toward the ribs of the corresponding set in the other column, wherein the cable retention tabs of one of the first sets of ribs are spaced from the cable retention tabs of the other of the first sets of ribs to define a vertical spacing, the vertical spacing extending rearwardly toward the front of the middle support, wherein the cable support and the cable retention member of the spools are positioned only in the vertical spacing.

16. The device of claim 15 wherein each rib from the first set is aligned with one of the ribs from the second set.

17. A cable management system comprising:
 a) a rack including a base, and two upwardly extending side supports configured and arranged for holding telecommunications equipment having front and rear cable connection locations, the rack further having a front, a rear, and a side;
 b) a ribcage cable support member mounted to the rack and positioned along the side, the ribcage cable support member including:
  1) a middle support having a front, a rear, and two sides, the middle support including:
   A) a plurality of spools positioned on the front;
   B) a plurality of holes between the front and the rear;
  2) two columns of vertically spaced-apart ribs on each side of the middle support, each column of ribs extending transversely away from the middle support on the front, each rib including a main portion extending from the middle support and a cable retention tab, each main portion of the ribs of one column horizontally aligned with the main portion of one of the ribs of the other column, each cable retention tab extending generally toward the ribs of the other column, wherein a cable positioning chamber is defined by the middle support and the two columns of spaced apart ribs;
 c) telecommunications equipment mounted to the rack, the equipment defining a plurality of rows of front cable connection locations on a front of the equipment, one of the columns of ribs positioned so as to have a rib adjacent to each row of front cable connection locations, the equipment further defining a plurality of rows of rear connection locations on the rear of the equipment.

18. The system of claim 17, wherein the plurality of spools are centrally positioned on the front of the middle support in a vertical array, and wherein an unobstructed cable pathway is defined between each column of ribs and the vertical array of spools.

19. The system of claim 18, wherein the rack is a first rack and, further comprising a second rack, the ribcage cable support member positioned between the first and second racks.

20. The system of claim 17, wherein the rack is a first rack and, further comprising a second rack, the ribcage cable support member positioned between the first and second racks.

21. A cable management device for use with a telecommunications equipment rack, the cable management device comprising:
 a) a middle support having a front, a rear, and two sides, the middle support including:
  1) a plurality of spools centrally positioned on the front in a vertical array, wherein each spool includes a cable support extending from the front and a cable retention member spaced from the front;
  2) a hole between the front and the rear;
 b) two columns of vertically spaced-apart ribs on each side, each column of ribs extending transversely away from the middle support on the front, each rib including a main portion extending from the middle support and a cable retention tab, each main portion of the ribs of one column horizontally aligned with the main portion of one of the ribs of the other column, each cable retention tab extending generally toward the ribs of the other column, wherein a cable positioning chamber is defined by the middle support and the two columns of spaced apart ribs, wherein an unobstructed cable pathway is defined between each column of ribs and the vertical array of spools, wherein the cable retentive tabs of one of the first sets of ribs are spaced from the cable retentive tabs of the other of the first sets of ribs to define a vertical spacing, the vertical spacing extending rearwardly toward the front of the middle support, wherein the cable support and the cable retention member of the spools are positioned only in the vertical spacing.

22. A cable management system comprising:
 a) a rack including a base, and two upwardly extending side supports configured and arranged for holding telecommunications equipment having front cable connection locations, the rack further having a front, a rear, and a side;
 b) a ribcage cable support member mounted to the rack and positioned along the side, the ribcage cable support member including:
  1) a middle support having a front, a rear, and two sides, the middle support including a plurality of spools centrally positioned on the front in a vertical array;
  2) two columns of vertically spaced-apart ribs on each side of the middle support, each column of ribs extending transversely away from the middle support on the front, each rib including a main portion extending from the middle support and a cable retention tab, each main portion of the ribs of one column horizontally aligned with the main portion of one of the ribs of the other column, each cable retention tab extending generally toward the ribs of the other column, wherein a cable positioning chamber is defined by the middle support and the two column of spaced apart ribs, wherein an unobstructed cable pathway is defined between each column of ribs and the vertical array of spools;
 c) telecommunications equipment mounted to the rack, the equipment defining a plurality of rows of front cable connection locations on a front of the equipment, one of the columns of ribs positioned so as to have a rib adjacent to each row of front cable connection locations.

23. The system of claim 22, wherein the rack is a first rack and, further comprising a second rack, the ribcage cable support member positioned between the first and second racks.

* * * * *